April 15, 1941.  W. MEYER ET AL  2,238,535
SWIVEL PIPE JOINT AND PACKING MEANS THEREFOR
Filed April 22, 1939  2 Sheets-Sheet 1
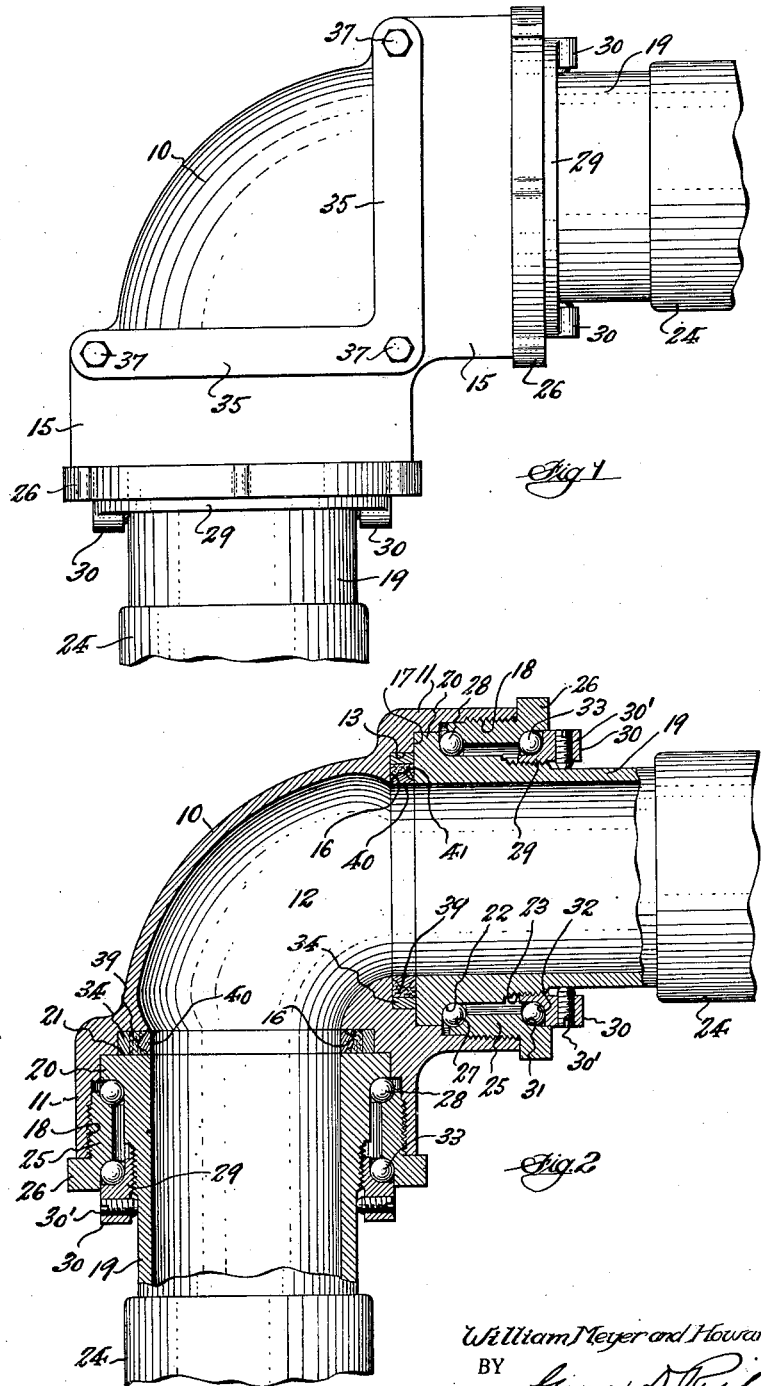
INVENTOR.
William Meyer and Howard C. Krone,
BY
ATTORNEY.

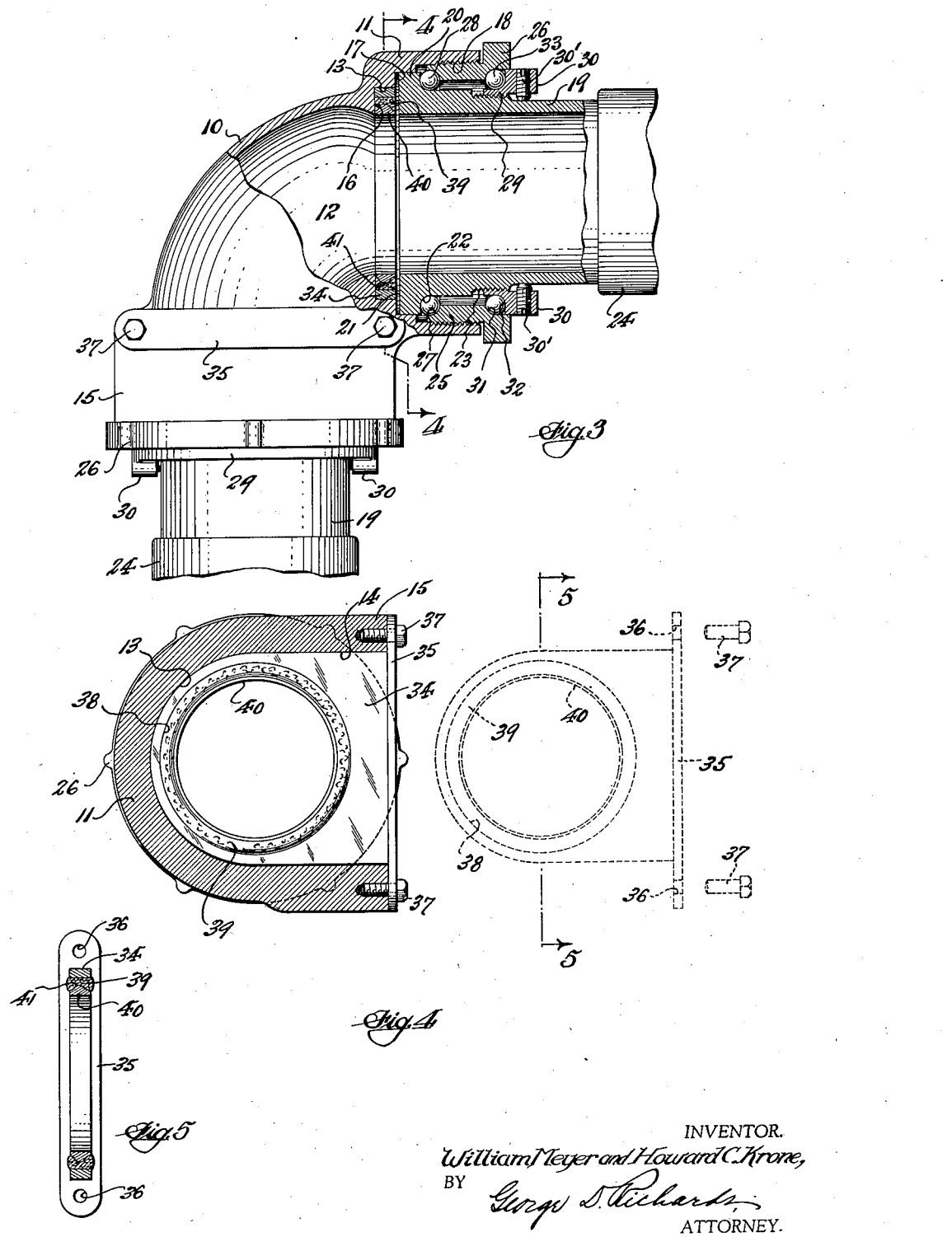

Patented Apr. 15, 1941

2,238,535

UNITED STATES PATENT OFFICE 2,238,535

SWIVEL PIPE JOINT AND PACKING MEANS THEREFOR

William Meyer, East Orange, and Howard C. Krone, Weehawken, N. J., assignors to A. W. Wheaton Brass Works, Inc., Newark, N. J., a corporation of New Jersey Application April 22, 1939, Serial No 269,426

4 Claims. (Cl. 285—97.8)

This invention relates to improvements in swivel pipe joints and packing means therefor.

This invention has for an object to provide a novel construction of swivel or swing joint connection for pipes, conduits and the like used to conduct or discharge fluids, and especially for use in delivering liquid petroleum products, such e. g. as gasoline and the like.

The invention has for a further object to provide a novel swivel or swing joint structure for pipe lines which includes a novel means for packing the same against leakage, said packing means being of such novel form and being related to the joint structure in such novel manner as to be readily removable for repair or replacement without necessitating taking apart of the joint, disconnecting the same from pipe or conduit sections which it serves to join, or otherwise dismantling the pipe line of which the joint structure forms a part.

The invention has for another object to provide a novel packed swing or swivel joint having a highly efficient ball-type anti-friction means between relatively rotatable parts thereof, together with means to easily and quickly adjust or set and thereupon retain said anti-friction means in operative relation to and between relatively rotatable parts served thereby.

Other objects of this invention, not at this time more particularly enumerated, will be understood from the following detailed description of the same.

An illustrative embodiment of the invention is shown in the accompanying drawings, in which—

Fig. 1 is a side elevation of a swing or swivel joint made according to the principles of this invention; Fig. 2 is a vertical longitudinal sectional view through the same, showing the parts thereof as operatively engaging the packing means with which the joint is provided; Fig. 3 is a view in part side elevation and in part longitudinal section, but showing the manner of manipulating parts of the joint structure to release the packing means for removal and replacement; Fig. 4 is a transverse sectional view, taken on line 4—4 in Fig. 3, the packing, as removed from the joint structure, being shown by the broken line representation thereof; and Fig. 5 is a cross-sectional view of the packing means, taken on line 5—5 in Fig. 4.

Similar characters of reference are employed in the hereinabove described views, to indicate corresponding parts.

An illustrative form of the novel swing or swivel joint, as shown, comprises a body portion provided by an elbow 10 or other suitably shaped member to be connected between lengths of pipe or conduit desired to be coupled for relative swinging or swiveling movement. Said body member or elbow 10 is provided at each end with an outwardly open bell section 11 of enlarged diameter, to constitute the female part of a swiveling means. As shown, the elbow 10 is provided with a swiveling means at each end, both of which are of like construction; one turning about a vertical axis and the other about a horizontal axis. Since the respective swiveling means are of like construction, description of one applies to the other, as is indicated by the application of like reference characters to their corresponding parts.

Provided within the inner end portion of said bell section 11, to surround the passage 12 of the elbow 10, is a packing chamber 13, the same extending laterally or radially, as at 14, to open outwardly from a side of said bell section 11 through an external laterally offset portion 15 with which the latter is provided. Said packing chamber is bounded on its inward side with a packing seat 16, the outward side being open. Outwardly of said packing chamber 13, the bell section 11 is provided with an internal annular recess 17 of enlarged diameter. At its outer end portion, said bell section 11 is provided with an internally threaded annular wall portion 18.

Adapted to be received into said bell section 11 is the inner end portion of a nipple member 19, which is provided with an annular flange 20 adapted to be rotatably received in said annular recess 17 of the bell section 11. The inwardly facing side of the thus flanged inner end portion of said nipple member 19 provides a packing seating face 21, which is opposed to the open side of said packing chamber. On its outwardly directed side, said flange 20 is provided with an anti-friction ball race 22. Outwardly of said ball race 22, the nipple member 19 is provided with an externally screw threaded portion 23. Screwed onto, or otherwise suitably received or coupled to the outer end of said nipple member 19 is a pipe or conduit section 24.

Screwed into the internally threaded annular wall portion 18 of the bell section 11, is the externally threaded shank portion 25 of a coupling nut member which is provided at its outer end with an annularly enlarged head portion 26; said head portion being suitably shaped to receive actuating engagement of a suitable tool for turning the same. At its inner end portion, said shank portion 25 is provided with an anti-friction ball race 27 adapted to be cooperatively opposed to the ball race 22 of the nipple member 19. Mounted between said ball races 22 and 27 are the anti-friction balls 28 which furnish an anti-friction bearing for the swiveling rotation of the nipple member 19 relative to the elbow 10. Screwed onto the externally threaded portion 23 of the nipple member 19 is a retainer ring 29 to abut the end of the coupling nut member. Said retainer ring 29 is provided with lugs 30 through which extend set screws 30', adapted, when screwed home, to engage the nipple member 19, thus affixing, together in operative assembled relation said nipple member, coupling nut member and intermediate anti-friction bearing means. While it is not absolutely essential, it is desirable to also provide an anti-friction means intermediate said coupling nut member and said retainer ring 29; to this end the outer internal extremity of said nut member is provided with a ball race 31 and the inner external extremity of said retainer ring is provided with cooperatively opposed ball race 32. Mounted between said ball races 31—32 are anti-friction balls 33 which furnish a second anti-friction bearing, spaced outwardly from the first described anti-friction bearing, thus providing a two point swiveling connection between the elbow 10 and nipple member 19.

The packing element of the swivel joint comprises a carrier plate 34 of a peripheral shape whereby the same fits the packing chamber 13, being slidable laterally thereinto through the outwardly open end 14 thereof. At its outer end portion, said carrier plate 34 is provided with a flanged external end portion 35 to abut the end of said laterally offset portion 15 of the elbow bell section 11. Provided in said flanged end portion 35 are openings 36 through which are passed fastening screws 37 adapted to screw into the portion 15, to thus secure said carrier plate 34 in operative assembled relation to the elbow bell section. Said carrier plate 34 is provided with an opening 38 adapted to align itself between the passages of the elbow section 10 and the nipple member 19, when said carrier plate is pushed home into the packing chamber 13. Suitably secured within said opening 38 is an annular packing member 39. Said packing member 39 is provided around its internal periphery with a keeper ring 40, the inner side of which is preferably provided with an annular projecting rib 41, which is imbedded in the packing member mass. Said keeper ring 40 serves to retain the packing member 39 against inward radial displacement.

When the carrier plate 34 is in place and the nipple member 19 is operatively assembled with the bell section 11 of the elbow 10 by screwing home the coupling nut 25—26, the packing member 39 will be compressed tightly between the packing seat 16 of the elbow and the seating face 21 of the nipple member 19, thus sealing the joint between these parts against leakage while never-the-less permitting relative rotation thereof.

Should it be desired to remove the packing, the operator by turning the coupling nut 25—26 may back off the same, for a small distance, relative to the elbow bell section 11. Such outward movement of the coupling nut is transmitted to the retainer ring 29 which, being affixed by the set screws 30' to the nipple member 19, transmits the latter and associated anti-friction bearing means a corresponding small outward movement relative to the elbow bell section 11 (see Fig. 3). Such outward movement of the nipple member 19 relaxes the pressure of its seating face 21 upon the packing member 39, thereby loosening the same relative to the packing chamber 13. It will be observed that these operations do not separate the nipple member 19 and elbow 10 from assembled relation, i. e. no complete dismantling of these parts as connected together is required, the effect being merely to relax the operative pressure or squeeze of these parts upon the packing material. After the packing is thus freed from squeeze or pressure, the operator, by removing the fastening screws 37, may release the carrier plate 34 so that the same, with the packing carried thereby, may be outwardly withdrawn and removed from the joint structure for repair or renewal of the packing material. Upon repair or renewal of the packing material, the same may be returned to cooperative relation to the joint structure by the reverse of the above described operations.

If desired, the carrier plates 34 at opposite ends of the elbow may be joined into an integral structure by providing the flanges 35 thereof in the form of an L-shaped one-piece form (as shown in Fig. 1), or the flanges may constitute separate elements, whereby the carrier plates 34 are independently manipulatable.

We are aware that various changes could be made in the devices and parts making up the above described packed swivel or swing joint structure, and that many apparently widely different embodiments of the features of this invention could be made without departing from the scope thereof as defined in the following claims. It is therefore intended that all matter contained in the above description or shown in the accompanying drawings shall be interpreted as illustrative and not in a limiting sense.

We claim:

1. In a swivel joint for piping and the like, a female member, a male member to enter said female member, means to provide a radially open packing chamber having an open side toward the male member, said male member having a packing seating face to oppose said packing chamber, a packing material carrier means insertable into said packing chamber through the radially open portion thereof, releasable means to secure the inserted carrier means against displacement, a coupling nut member having a threaded engagement with said female member and a rotatable relation to said male member, means on said male member to receive the inward thrust of said coupling nut member, means affixable to said male member to receive the outward thrust of said coupling nut member, anti-friction bearings between the male member and said coupling nut member, and additional anti-friction bearings between said coupling nut member and thrust receiving means.

2. In a device of the kind described, an elbow having at each end a swivel joint structure to connect pipe lines thereto, each such structure comprising a bell section extending from an end of the elbow, said bell section having a radially open packing chamber having an axial outwardly open side, a packing carrier plate removably insertable into said packing chamber through the radially open portion thereof, means to secure said carrier plate in inserted operative relation to said packing chamber, a nipple member receivable in said bell section, a coupling nut member threaded into the end of said bell section, means on the inner end of said nipple member to receive the inward thrust of said coupling nut member to thereby force said inner end, as opposed to the axial outwardly open side of said packing chamber, into operative engagement with the packing carried by the inserted carrier plate, a retainer ring externally mounted on said nipple member, said retainer ring having means to fix the same to said nipple member subject to outward thrust of said coupling nut member, anti-friction bearings intermediate said nipple member and coupling nut member, and additional anti-friction bearings between said coupling nut member and retainer ring.

3. A swivel connection for pipes and the like including a female member, a male member insertable in said female member, an anti-friction bearing gland also insertable in said female member about said male member, anti-friction bearings confined between said male member and said gland so that there may be relative rotation of the male and female members, means to affix said gland to said female member so that the bearings hold the male and female members against longitudinal movement, and a packing to be clamped in fixed position by said means by being inserted laterally in said female member.

4. A swivel connection for pipes and the like including a female member, a male member insertable in said female member, an anti-friction bearing gland also insertable in said female member about said male member, anti-friction bearings confined between said male member and said gland so that there may be relative rotation of the male and female members, a retainer ring entered into the outer end of said gland, additional anti-friction bearings confined between said gland and said retainer ring, releasable means to affix said retainer ring to said male member for rotation therewith, and a packing to be clamped in fixed position by said gland and retainer ring by being inserted laterally in said female member.

WILLIAM MEYER.
HOWARD C. KRONE.